(12) United States Patent
Van der Goes

(10) Patent No.: US 10,020,829 B2
(45) Date of Patent: Jul. 10, 2018

(54) METHOD AND APPARATUS TO AVOID NOISE FIGURE DEGRADATION OF A WIRELESS RECEIVER BY A BLOCKER

(71) Applicant: Avago Technologies General IP (Singapore) Pte. Ltd., Singapore (SG)

(72) Inventor: Frank Van der Goes, Zeist (NL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 64 days.

(21) Appl. No.: 14/793,139

(22) Filed: Jul. 7, 2015

(65) Prior Publication Data
US 2016/0241280 A1 Aug. 18, 2016

Related U.S. Application Data

(60) Provisional application No. 62/117,445, filed on Feb. 17, 2015.

(51) Int. Cl.
*H03K 3/013* (2006.01)
*H04B 1/10* (2006.01)
*H04B 15/04* (2006.01)
*H04L 5/16* (2006.01)

(52) U.S. Cl.
CPC .............. *H04B 1/10* (2013.01); *H04B 15/04* (2013.01); *H04L 5/16* (2013.01)

(58) Field of Classification Search
CPC ..... H03M 1/0836; H03M 1/0854; H03M 1/66
USPC .................................................. 375/226, 227
See application file for complete search history.

(56) References Cited

U.S. PATENT DOCUMENTS

| | | | | |
|---|---|---|---|---|
| 6,307,877 | B1* | 10/2001 | Philips | G06F 8/10 375/130 |
| 7,010,286 | B2* | 3/2006 | Sorrells | H04B 1/16 327/356 |
| 8,248,297 | B1* | 8/2012 | Baker | G01S 7/4052 342/159 |
| 2014/0210536 | A1* | 7/2014 | Kurchuk | H03K 3/013 327/292 |

* cited by examiner

*Primary Examiner* — Charles C Jiang
*Assistant Examiner* — Will Lin
(74) *Attorney, Agent, or Firm* — Foley & Lardner LLP

(57) ABSTRACT

In some aspects, the disclosure is directed to methods and systems for improving noise figure of a wireless receiver. A wireless transmitter up-converts a first signal using a shared clock source in one or more embodiments. The wireless transmitter transmits the up-converted first signal in a first communication protocol and phase noise from the shared clock source in one or more embodiments. A wireless receiver receives, during transmission of the up-converted first signal, a plurality of signals including a second signal in a second communication protocol, a portion of the up-converted first signal and a portion of the phase noise, in one or more embodiments. The wireless receiver down-converts the received plurality of signals using the shared clock source to reduce or cancel the phase noise in one or more embodiments.

20 Claims, 9 Drawing Sheets

METHOD AND APPARATUS TO AVOID NOISE FIGURE DEGRADATION OF A WIRELESS RECEIVER BY A BLOCKER

RELATED APPLICATIONS

This application claims priority to and the benefit of U.S. Provisional Patent Application No. 62/117,445, filed Feb. 17, 2015. The entire contents of the foregoing are hereby incorporated herein by reference for all purposes.

FIELD OF THE DISCLOSURE

This disclosure generally relates to systems and methods for improving performance of a wireless receiver, including systems and methods for signal processing.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As increased data throughput and other developments occur, updates and new standards are constantly being developed for adoption, such those associated with the third generation partnership project (3GPP).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE); LTE-Advanced (LTE-A); and 3GPP. Although this disclosure can reference aspects of these standard(s) and specification(s), the disclosure is in no way limited to these aspects.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods to avoid noise figure degradation of a wireless receiver by a blocker.

A. Computing and Network Environment

Figure 1A:
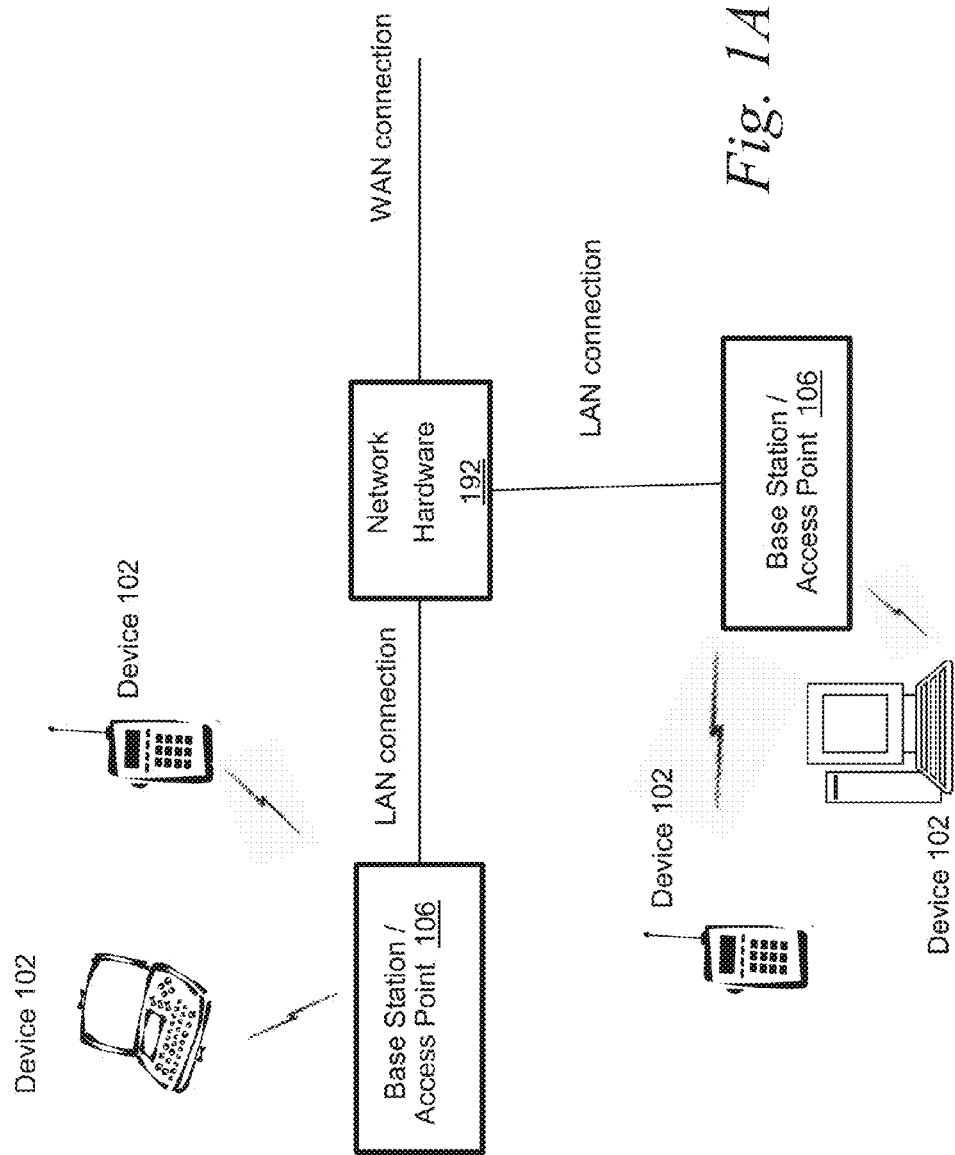
FIG. 1A is a block diagram depicting an embodiment of a network environment including one or more wireless communication devices in communication with one or more devices or stations.

Prior to discussing specific embodiments of the present solution, it might be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B." "evolved Node B (eNode B or eNB)," home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), such as in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless connections using radio frequency links for other devices 102 to utilize that wired connection. A base station 106 can be built and/or implemented to support a standard for sending and receiving data using one or more radio frequencies. Those standards, and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
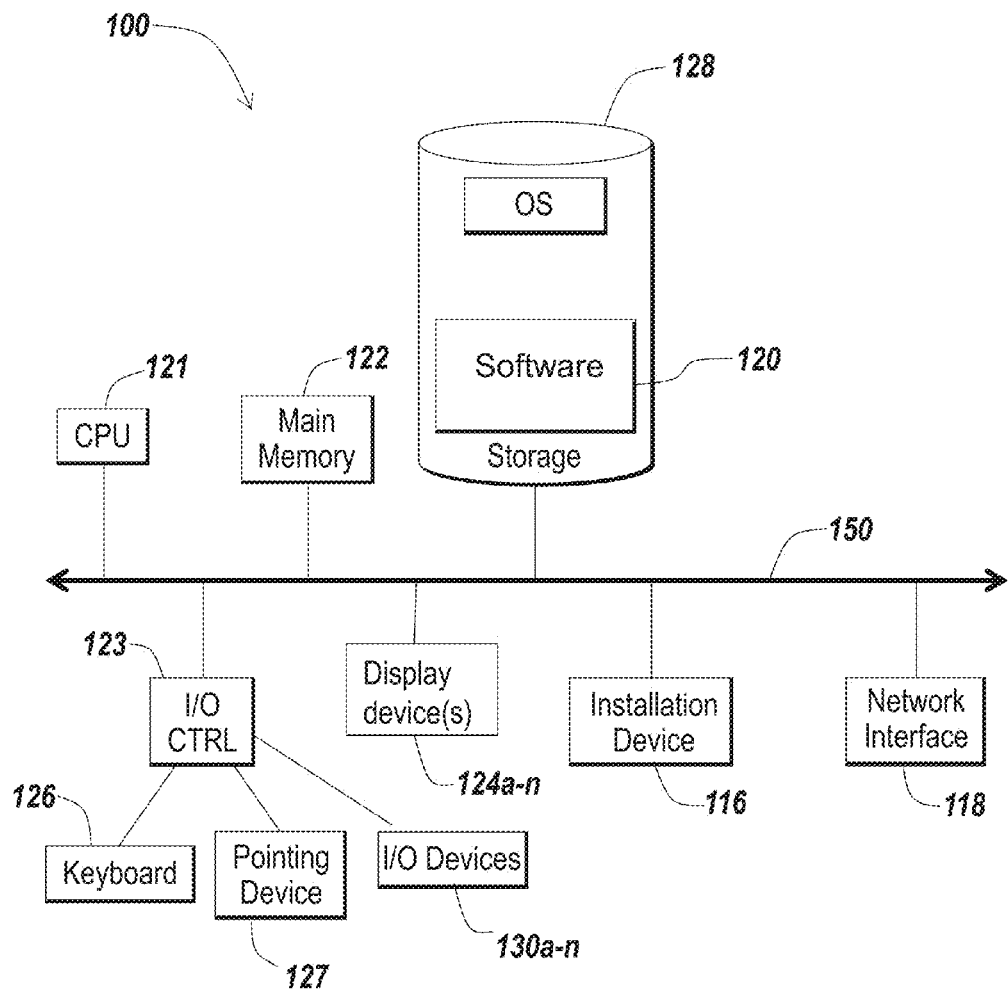
FIGS. 1B and 1C are block diagrams depicting embodiments of computing devices useful in connection with the methods and systems described herein.
Figure 1C:
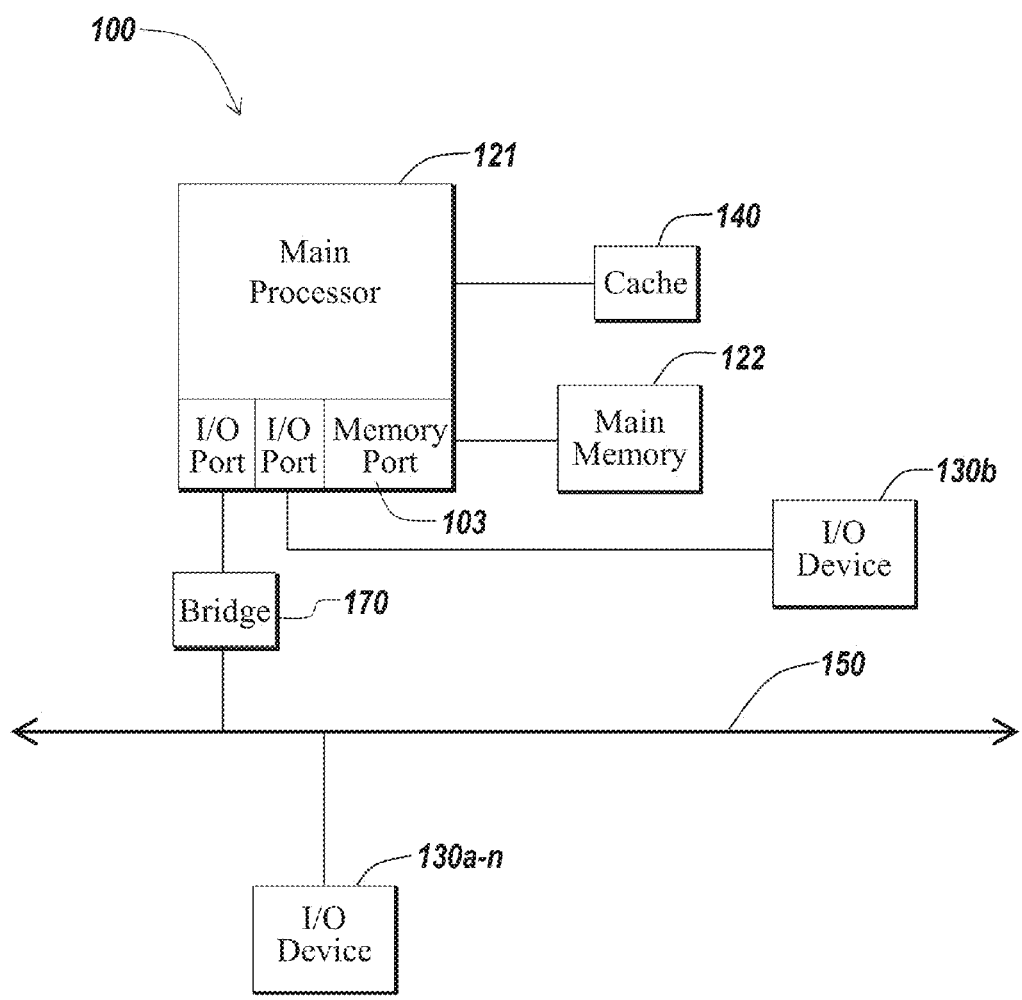

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINI-BAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be implemented for using multiple displays 124*a*-124*n*. One ordinarily skilled in the art will recognize and appreciate the various ways and embodiments that a computing device 100 can be implemented to have one or more display devices 124*a*-124*n*.

In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Avoiding Noise Figure Degradation of a Wireless Receiver by a Blocker

Described herein are systems and methods for avoiding noise figure (NF) degradation of a wireless receiver by a blocker. In some implementations, a device 102 is designed to communicate via a plurality of communications protocol in one or more embodiments. The device 102 incorporates a plurality of subsystems for enabling communications in the plurality of communications protocols, in one or more embodiments. In one or more embodiments, the device 102 includes at least one receiver and at least one transmitter operating at the same time or simultaneously, for at least one or more time instances or periods of time. For example, a first transmitter of the device 102 transmits using a first communications protocol, for example Bluetooth, and a first receiver of the device 102 receives a signals in a second communications protocol, for example a 802.11x protocol, in one or more embodiments. This mode or manner of operation is sometimes referred to as co-existence mode. The device supports co-existence of, or simultaneous operations via the first and the second communications protocols, in one or more embodiments. The first and the second communications protocols are for, or support half duplex communications in one or more embodiments.

In one or more embodiments, the transmitting operation, the transmitter and/or the communications protocol being used at the transmitter acts or operates as a blocker. A blocker degrades the NF of a wireless receiver, by introducing interfering signals or noise from the transmitter to the receiver for example, in one or more embodiments. A NF is sometimes referred to as a noise factor. In one or more embodiments, a NF is a measure of degradation of signal-to-noise ratio (SNR), for example caused by components in a radio frequency (RF) signal chain. In one or more embodiments, a NF is a number by which the performance of an amplifier or a receiver can be specified, with lower values indicating better performance. A blocker that is sufficiently proximate or close to a receiver, for example on a same device, can degrade the NF of the receiver. The blocker introduces significant out-of-band (OOB) noise to degrade the NF or SNR in one or more embodiments. In one or more embodiments, reciprocal mixing of the receiver local oscillator (LO) degrades the NF or SNR. As an example, for WLAN and Bluetooth (BT) simultaneous operation in a device 102, the WLAN receiver NF is degraded during BT transmission, in one or more embodiments. In one or more embodiments, the BT NF is degraded during WLAN transmission.

In one or more aspects, this disclosure is directed to a method for improving noise figure. In one or more embodiments, the method includes up-converting, in a wireless transmitter, a first signal using a shared clock source. In one or more embodiments, the wireless transmitter transmits the up-converted first signal in a first communication protocol, with phase noise from the shared clock source. In one or more embodiments, a wireless receiver receives, during transmission of the up-converted first signal, a plurality of signals including a second signal in a second communication protocol, a portion of the up-converted first signal and a portion of the phase noise. In one or more embodiments, the wireless receiver reduces at least a portion of the received portion of the phase noise, by down-converting the received plurality of signals using the shared clock source.

In one or more embodiments, the wireless transmitter transmits in half-duplex operation using the first communication protocol. In one or more embodiments, the wireless receiver receives in half-duplex operation using the second communication protocol. In one or more embodiments, the phase noise from the shared clock source includes OOB noise with a frequency distribution that overlaps with a frequency band of the second signal. In one or more embodiments, the up-converting (by the wireless transmitter) includes digital-to-analog conversion of the first signal using a sampling frequency from the shared clock source. In one or more embodiments, the down-converting (by the wireless receiver) includes analog-to-digital conversion of the received plurality of signals using the sampling frequency from the shared clock source.

In one or more embodiments, the wireless transmitter transmits the first signal in a first frequency band, and the wireless receiver receives the second signal in a second frequency band. In one or more embodiments, each of the first frequency band and the second frequency band overlaps in frequency with the phase noise from the shared clock source. In one or more embodiments, the wireless receiver configures a delay between the shared clock source and a receive chain of the wireless receiver. In one or more embodiments, the delay is adjusted to match a propagation delay that includes a first delay in propagating the phase noise from the shared clock source along a transmit chain of the wireless transmitter, and a second delay in propagating the portion of the phase noise from the transmit chain to the receive chain up to a point in the receive chain for the down-conversion. In one or more embodiments, the first communication protocol and the second communication protocol each includes one of a bluetooth, a WLAN or a LTE based communication protocol. In one or more embodiments, the wireless transmitter and the wireless receiver each operates at a different frequency band.

In one or more aspects, this disclosure is directed to a system for improving noise figure. In one or more embodiments, the system includes a shared clock source. In one or more embodiments, a wireless transmitter of the system up-converts a first signal using the shared clock source, and transmits the up-converted first signal in a first communication protocol with phase noise from the shared clock source. In one or more embodiments, a wireless receiver of the system receives, during transmission of the up-converted first signal, a plurality of signals including a second signal in a second communication protocol, a portion of the up-converted first signal and a portion of the phase noise. In one or more embodiments, the wireless receiver reduces or cancels, in the wireless receiver, the received at least a portion of the phase noise, by down-converting the received plurality of signals using the shared clock source.

In one or more embodiments, the wireless transmitter transmits in half-duplex operation using the first communication protocol. In one or more embodiments, the wireless receiver receives in half-duplex operation using the second communication protocol. In one or more embodiments, the phase noise from the shared clock source includes OOB noise with a frequency distribution that overlaps with a frequency band of the second signal. In one or more embodiments, the wireless transmitter performs digital-to-analog conversion of the first signal using a sampling frequency from the shared clock source, and the wireless receiver performs analog-to-digital conversion of the received plurality of signals using the sampling frequency from the shared clock source. In one or more embodiments, the wireless transmitter transmits the first signal in a first frequency band and the wireless receiver receives the second signal in a second frequency band, each of the first frequency band and the second frequency band overlapping in frequency with the phase noise from the shared clock source.

In one or more embodiments, the system includes a delay element between the shared clock source and a receive chain of the wireless receiver. In one or more embodiments, the delay element is adjusted or set to match a propagation delay that includes a first delay in propagating the phase noise from the shared clock source along a transmit chain of the wireless transmitter, and a second delay in propagating the portion of the phase noise from the transmit chain to the receive chain up to a point in the receive chain for the down-conversion. In one or more embodiments, the first communication protocol and the second communication protocol each includes one of a bluetooth, a WLAN or a LTE based communication protocol. In one or more embodiments, the wireless transmitter and the wireless receiver each operates at a different frequency band.

In one or more aspects, this disclosure is directed to a method for improving noise figure. In one or more embodiments, the method includes performing, in a wireless transmitter, digital-to-analog conversion using a sampling frequency from a shared clock source, to generate a first signal in a first communication protocol. In one or more embodiments, the wireless transmitter transmits, via a first antenna, the generated first signal with phase noise from the shared clock source. In one or more embodiments, a wireless receiver receives, via a second antenna, a plurality of signals including a second signal in a second communication protocol, a portion of the transmitted first signal and a portion of the transmitted phase noise. In one or more embodiments, the wireless receiver performs, using the sampling frequency from the shared clock source, analog-to-digital conversion of the received plurality of signals, and reduction or cancellation of the portion of the transmitted phase noise.

In one or more embodiments, the wireless transmitter transmits in half-duplex operation using the first communication protocol, and the wireless receiver receives in half-duplex operation using the second communication protocol. In one or more embodiments, the phase noise from the shared clock source includes OOB noise with a frequency distribution that overlaps with a frequency band of the second signal. In one or more embodiments, the wireless transmitter transmits the first signal in a first frequency band and the wireless receiver receives the second signal in a second frequency band, each of the first frequency band and the second frequency band overlapping in frequency with the phase noise from the shared clock source.

In one or more embodiments, the wireless receiver is configurable to include a delay between the shared clock source and a receive chain of the wireless receiver. In one or more embodiments, the delay is adjusted or set to match a propagation delay including a first delay in propagating the phase noise from the shared clock source along a transmit chain of the wireless transmitter, and a second delay in propagating the portion of the phase noise from the transmit chain to the receive chain up to a point in the receive chain for the down-conversion. In one or more embodiments, the first communication protocol and the second communication protocol each includes one of a bluetooth, a WLAN or a LTE based communication protocol, and the wireless transmitter and the wireless receiver each operates at a different frequency band.

Figure 2A:
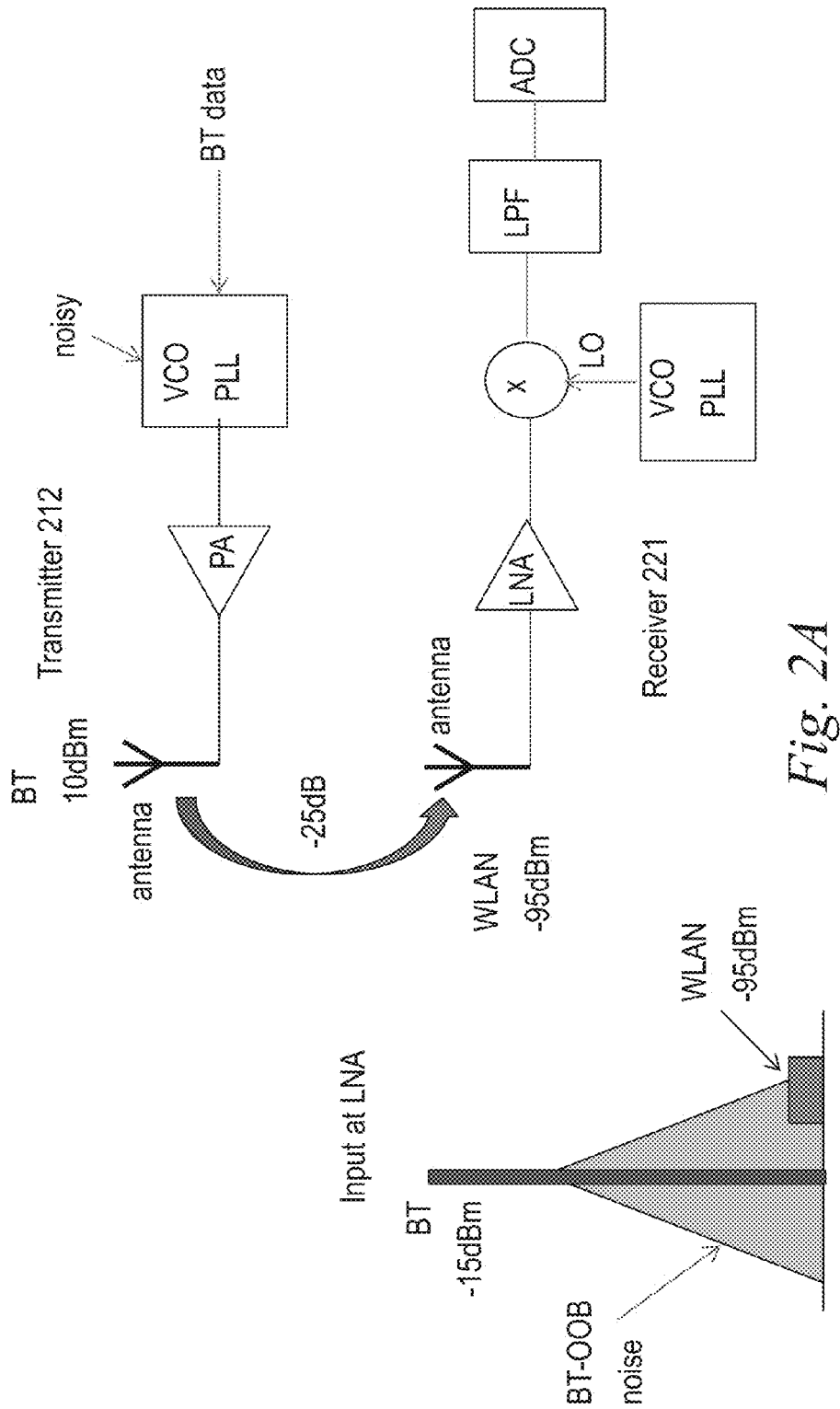
FIG. 2A is a diagram depicting one embodiment of a system supporting co-existence mode.

Referring to FIG. 2A, one example embodiment of a system supporting co-existence mode is depicted. The system includes a transmitter 212 and a receiver 221 in one or more embodiments. In one or more embodiments, the transmitter 212 is part of a transceiver, e.g., of a first subsystem operating in a first communications protocol and/or a first frequency band. The transmitter 212 (or transmit chain) includes an amplifier PA (e.g. a power amplifier), a clock source such as a voltage controlled oscillator (VCO) phase locked loop (PLL), and an antenna in one or more embodiments. In one or more embodiments, the receiver 221 is part of a transceiver, e.g., of s second subsystem operating in a second communications protocol and/or a second frequency band. The receiver 221 (or receive chain) includes an amplifier LNA (e.g. a low noise amplifier), a mixer X, a clock source such as LO with a VCO PLL, a low pass filter LPF and an antenna in one or more embodiments.

By way of example and in one or more embodiments, FIG. 2A depicts BT transmission from the transmitter 212 and WLAN reception at the receiver 221, although different combinations of communication protocols are possible and contemplated. At certain time instances for example, the WLAN receiver 221 and the BT transmitter operate simultaneously in one or more embodiments. Each of the above-mentioned elements or modules is implemented in hardware, or a combination of hardware and software, in one or more embodiments. For instance, each of these elements or modules can include any application, program, library, script, task, service, process or any type and form of executable instructions executing on hardware of the device 102, in one or more embodiments. The hardware includes circuitry that includes one or more processors, for example, as described above in connection with at least 1B and 1C, in one or more embodiments.

In one or more embodiments, a blocker arises from a transmitter 212 that operates proximate to a receiver 221 in distance and/or frequency. The blocker degrades the NF of the WLAN receiver 221, in one or more embodiments. The BT VCO produces significant OOB noise. By way of non-limiting illustration, and in one or more embodiments, with a −25 dB coupling between the transmitter antenna and the receiver antenna (e.g., an attenuation of 25 dB), a 10 dBm BT signal at the transmitter antenna couples to the receiver antenna, resulting in a signal level of about −15 dBm at the LNA. In addition, the OOB noise output from the transmitter antenna is similarly coupled to the receiver 221 in one or more embodiments. The OOB noise is distributed around the frequency of the transmitter (e.g., BT) signal. The receiver 221 also receives a WLAN signal (e.g., with a signal strength of −95 dBm) in one or more embodiments. The frequency spectrum of the BT signal, the OOB noise and the WLAN signal, at the input of the LNA in one or more embodiments, is depicted on the left portion of FIG. 2A. Although the BT signal may not overlap with the WLAN signal, the BT OOB noise has a frequency distribution sufficiently wide (around the BT signal) to overlap with at least a portion of the WLAN signal, and interfere with the WLAN signal, in one or more embodiments. In one or more embodiments, some portion(s) of the OOB noise are at signal levels that exceed that of the WLAN signal. The right portion of FIG. 2A shows one example embodiment of the configuration of the receive and transmit chains, and the coupling of the BT OOB noise to the receiver.

In one or more embodiments, the OOB noise includes noise having one or more phase components. In one or more embodiments, the OOB noise can be canceled in part or in whole by noise with the same phase characteristics as the OOB noise. In one or more embodiments, the OOB noise includes other types of noise. In one or more embodiments, the OOB noise predominantly includes phase noise. In one or more embodiments, phase noise refers to the frequency domain representation of rapid, short-term and/or random fluctuations in the phase of a waveform (e.g., a clock signal), caused by time domain instabilities (e.g., jitter).

Figure 2B:
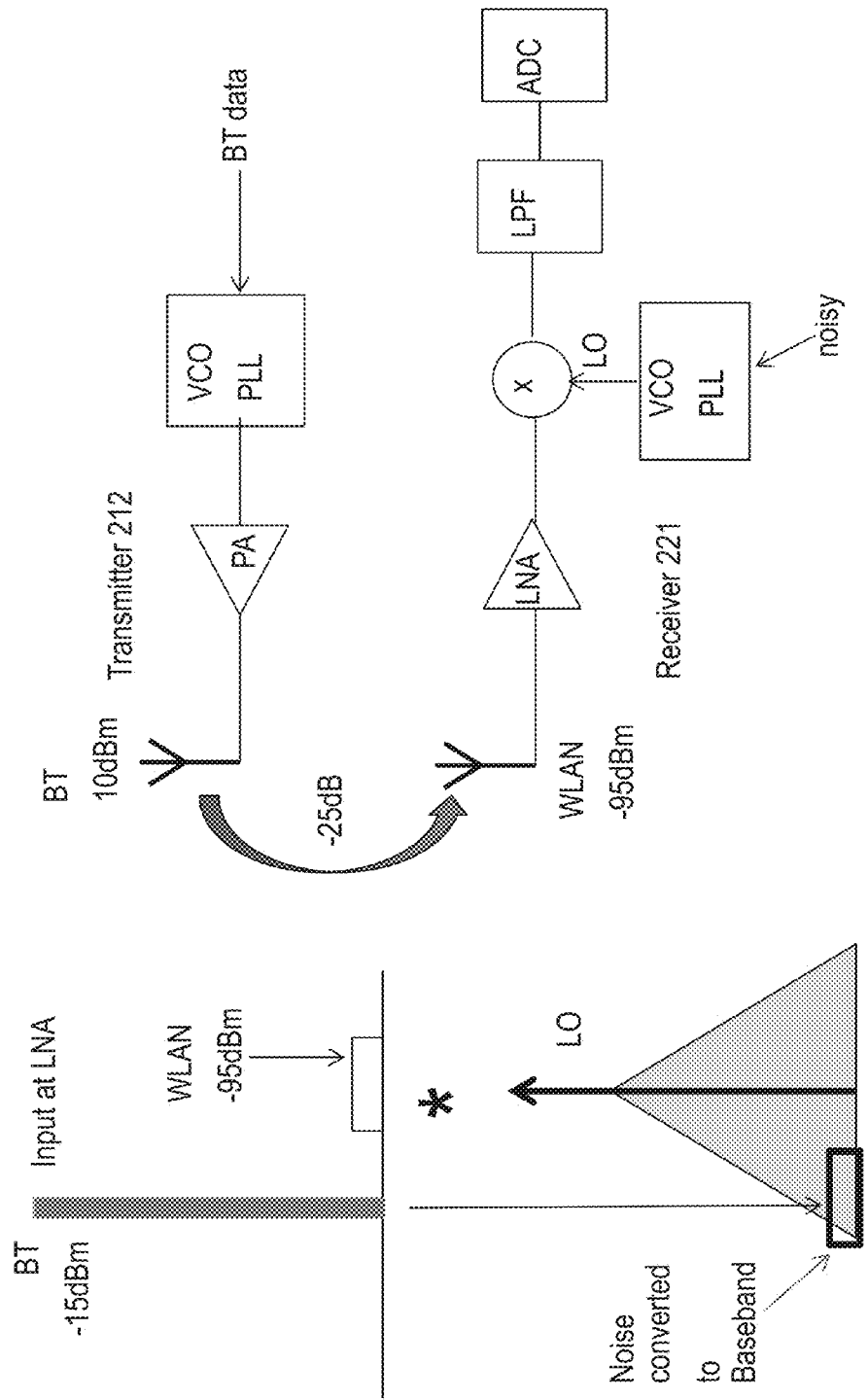
FIG. 2B is a diagram depicting another embodiment of a system supporting co-existence mode.

Referring to FIG. 2B, one embodiment of a system for supporting co-existence is depicted with reciprocal mixing in association with a receiver clock. By way of example, and in one or more embodiments, the transmitter 212 and receiver 221 operates similarly to that described above in connection with FIG. 2A. For example, the transmit chain operates using a first protocol (e.g., the BT protocol) and the receive chain operates using a second protocol (e.g., the WLAN protocol). In the receive chain, there is mixing of signals received via the receiver antenna with the WLAN VCO clock signal. The top-left portion of FIG. 2B depicts the frequency spectrum of the BT signal and the WLAN signal observed at the input of the LNA, in one or more embodiments. The bottom-left portion of FIG. 2B depicts the frequency spectrum of noise introduced by the noisy receive chain VCO or clock. The receive chain VCO noise is centered around the LO or clock signal frequency in one or more embodiments. The "*" denotes mixing or convolution of the various signals at the mixer X, in one or more embodiments. One or more of the signals (e.g., BT signal, WLAN signal, and/or VCO noise) are converted to baseband, e.g., using the LO signal, in one or more embodiments. In one or more embodiments, the WLAN signal and a portion of the VCO noise convolve or mix to cause NF degradation. At baseband, the one or more resulting signals overlap, superimpose or combine together, causing interference to the baseband WLAN signal at the mixer X output, in one or more embodiments. This causes degradation of NF or SNR in the receiver 221, in one or more embodiments.

Figure 2C:
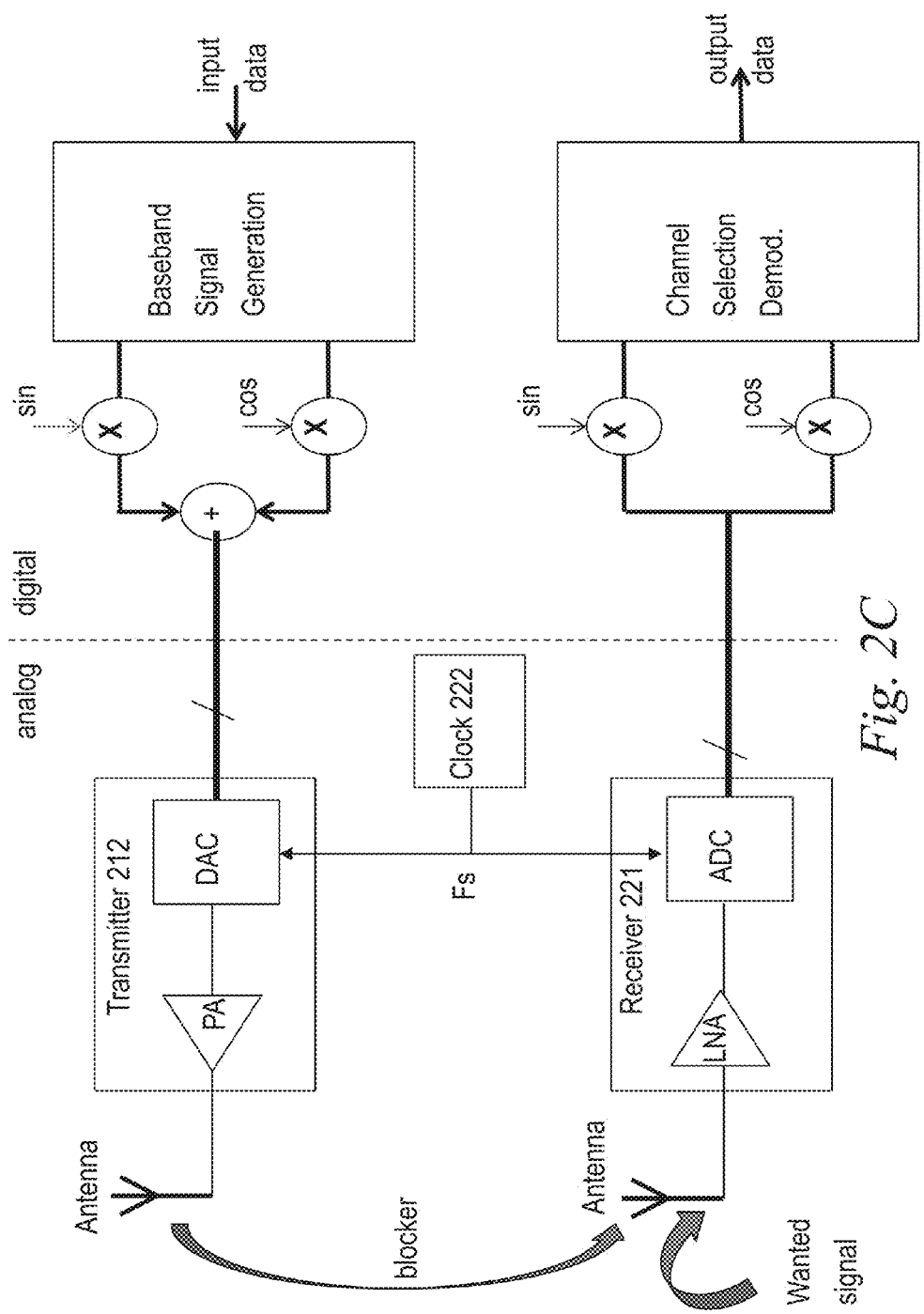
FIG. 2C is a block diagram depicting an embodiment of a system for improving noise figure of a wireless receiver.

Referring to FIG. 2C, one embodiment of a system for improving the NF of a wireless receiver is depicted. In brief overview, the system includes at least one transmitter 212 and at least one receiver 221, e.g., in one or more devices 102, in one or more embodiments. The system or device 102 includes or uses a shared clock source (e.g., of frequency Fs) between the at least one transmitter 212 and at least one receiver 221, in one or more embodiments. In one or more embodiments, the at least one transmitter 212 and at least one receiver 221 is implemented in two or more devices 102 using a shared clock source. By way of illustration, the present disclosure may, for simplicity, refer to a device 102 with a transmitter 212 and a receiver 221 having a shared clock. In one or more embodiments, the shared clock source is a single clock source or clock generator with noise characterized by the same phase components. The transmitter 212 includes at least some elements of the transmitter 212 described above in connection with FIGS. 2A-2B, e.g., an amplifier PA. The receiver 221 includes at least some elements of the transmitter 221 described above in connection with FIGS. 2A-2B, e.g., an amplifier LNA. In one or more embodiments, the transmitter 212 includes a digital-to-analog converter (DAC) in an analog portion of the transmit chain, with the amplifier PA for example. In one or more embodiments, the receiver 221 includes an analog-to-digital converter (ADC) in an analog portion of the receive chain, with the amplifier LNA for example.

In one or more embodiments, the transmitter 212 includes a digital portion that obtains input data and performs baseband signal generation, in one or more embodiments. The digital portion performs processing, mixing and/or modulation of the generated baseband signal to generate a digital signal, in one or more embodiments. The digital portion transmits the digital signal to the DAC, in one or more embodiments, to convert into an analog signal for amplification and transmission via an antenna. In one or more embodiments, the receiver 221 includes a digital portion that receives a digital signal output from the ADC. The digital portion of the receive chain performs processing, mixing and/or demodulation of the digital, e.g., using a channel selection demodulator, in one or more embodiments. The channel selection demodulator outputs demodulated data in the digital portion of the receive chain, in one or more embodiments. Each of the above-mentioned elements, modules or portions is implemented in hardware, or a combination of hardware and software, in one or more embodiments. For instance, each of these elements, modules or portions can include any application, program, library, script, task, service, process or any type and form of executable instructions executing on hardware of the device 102, in one or more embodiments. The hardware includes one or more of circuitry or a processor, for example, as described above in connection with at least 1B and 1C, in one or more embodiments.

In one or more embodiments, the shared clock source includes a VCO PLL, for example, with features similar to the VCO PLL described above in connection with FIGS. 2A-2B. In one or more embodiments, the shared clock source is noisy (e.g., introduces OOB noise), as in the clock source(s) described above in connection with FIGS. 2A-2B. In one or more embodiments, the shared clock source is designed to have a reduced noise level relative to that of the clock source(s) described above in connection with FIGS. 2A-2B. The shared clock source provides a clock 222 or clock signal, e.g., operating at a frequency Fs, in one or more embodiments. The DAC and/or ADC uses the frequency Fs as a sampling frequency, e.g., for sampling signals or for signal reconstruction from samples, in one or more embodiments. The DAC and/or ADC operates at gigabit or gigahertz sampling frequency, in one or more embodiments. The device 102 incorporates at least one high-speed, wideband DAC and/or ADC (e.g., using one or more wideband tuner) in one or more embodiments. In one or more embodiments, the use of the shared clock allows the system to decouple the frequency of the signals within the digital portion(s), from the frequency of transmission or reception in the analog portion(s).

Figure 2D:
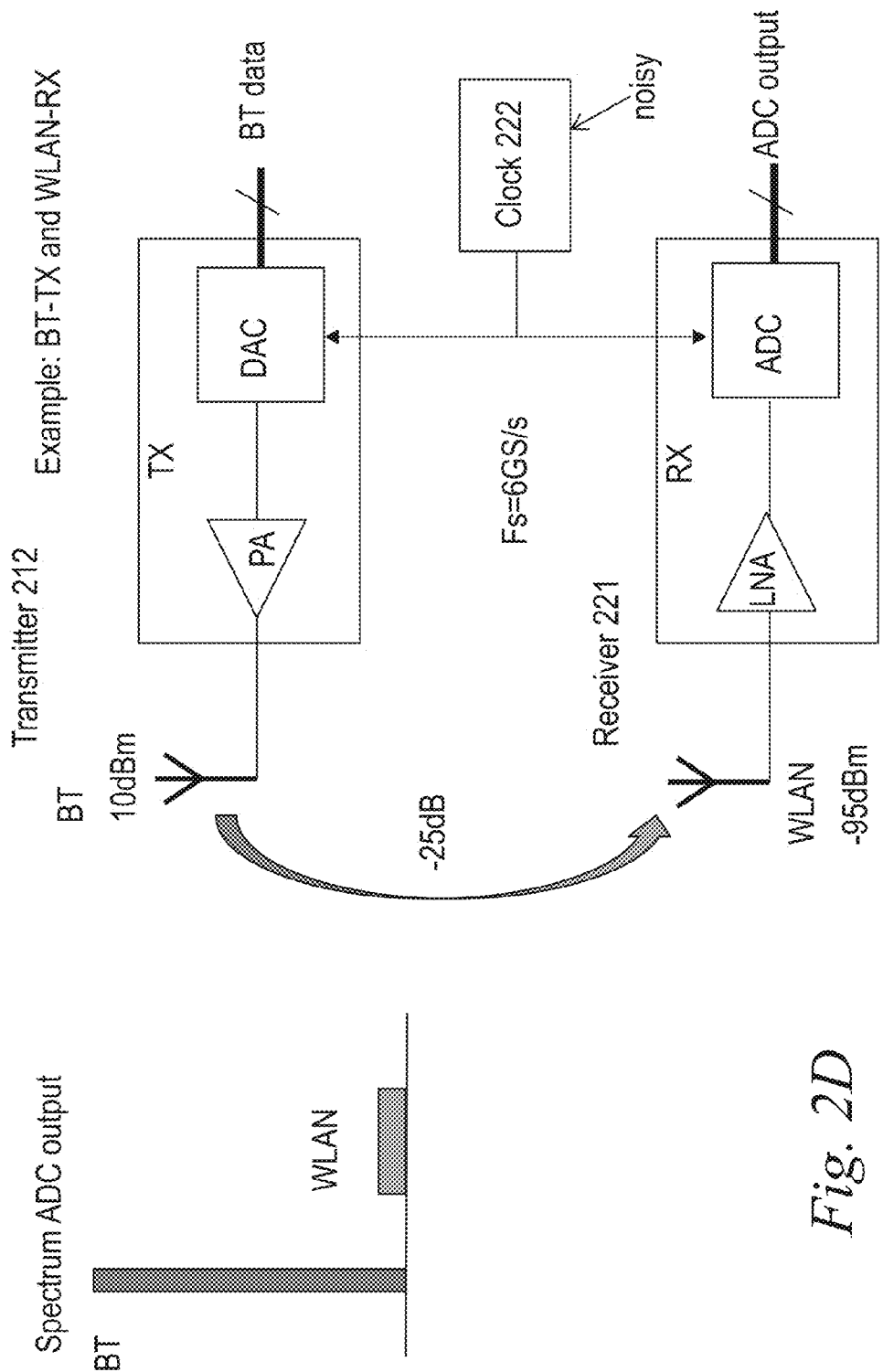
FIG. 2D is a diagram depicting one embodiment of a system for improving noise figure of a wireless receiver.

Referring to FIG. 2D, one embodiment of a system for improving the NF of a wireless receiver is depicted. In one or more embodiments, the depicted system is a portion of (or a simplified representation of) the system described above in connection with FIG. 2C. The system includes a shared clock 222 (e.g., operating at Fs=6 Giga-samples per second), in one or more embodiments. A transmitter 212 and a receiver 221 shares a same clock source (clock 222), in one or more embodiments. The transmitter 212 produces a blocker to the receiver 221 responsive to the transmitter 212 and the receiver 221 being active at the same time. When the transmitter 212 and the receiver 221 operate at the same time using clock 222, the system inherently enables the OOB noise from the transmitter 212 to be canceled at least in part, in one or more embodiments. The system has or sees reduced reciprocal mixing when the transmitter 212 and the receiver 221 operate at the same time using clock 222. For example, responsive to the transmitter 212 and the receiver 221 using the same clock 222, the ADC cancels at least a portion of the OOB noise arising from the transmitter 212, with noise from the same clock 222, in one or more embodiments. Responsive to the transmitter 212 and the receiver 221 using the same clock 222 (and operating or being active at the same moment in time), the ADC produces reduced levels of reciprocal mixing, in one or more embodiments. As a result, phase noise from the clock 222 is significantly reduced in the ADC output spectrum. For instance, the left portion of FIG. 2D shows that phase noise at the ADC output is hardly noticeable. In one or more embodiments, this NF improvement technique can be applied for a blocker that is generated internally within the system or device 102 having the transmitter 212 and the receiver 221.

In one or more embodiments, the transmitter 212 and the receiver 221 share the same clock 222, which ensures that the phase noise introduced to the transmitter 212 and the receiver 221 are the same or identical. This allows cancellation of at least a portion of the phase noise introduced directly via the clock 222 in the receive chain, in one or more embodiments. In one or more embodiments, the carrier frequencies (or frequency bands) of the transmitted and received (or wanted) signal may be the same or close together. In one or more embodiments, the carrier frequencies of the transmitted and received (or wanted) signal may not be the same. If carrier frequencies (or frequency bands) for the transmitter 212 and the receiver 221 are not the same, the wideband approach for the transmitter 212 and/or the receiver 221 enables the use of a shared clock source. The high frequency clock 222 can be used in both the ADC and DAC to process the signals having the different carrier frequencies (e.g., relatively lower frequencies), in one or more embodiments.

By way of illustration, the present methods and systems can be implemented in connection with various combinations of communications protocols for transmit and receive, such as those indicated in Table 1 below. In one or more embodiments, a first communication protocol and a second communication protocol refer to the same communication protocol being used over different frequency channels for transmit and receive.

TABLE 1

| Transmit | Receive | Examples |
| --- | --- | --- |
| BT | WLAN | BT/WLAN devices with simultaneous operation |
| WLAN | BT | BT/WLAN device with simultaneous operation |
| WLAN | LTE | |
| BT | LTE | |
| LTE | WLAN | LTE bands 7, 40 and 41 are relatively close to 2.4 GHz Industrial, Scientific and Medical (ISM) band of WLAN |
| LTE | BT | |
| LTE | LTE | LTE FDD: TX and RX operates simultaneously. |
| WLAN | WLAN | Custom WLAN mode (e.g. one AP is active in multiple WLAN channels simultaneously) |

In one or more embodiments, and by way of illustration, an expected improvement by using the present technique may be as much as 10-20 dB in NF, if the actual degradation by the phase noise is 20 dB for example. Actual degradation by phase noise may be 40-50 dB in some embodiments, so the extent of improvement (e.g., up to 50 dB) by using a shared clock can be substantial. Such improvements may be expected where the receive carrier frequency (or frequency band) is close to transmit carrier frequency (or frequency band), in one or more embodiments. Although improvements in performance for the receive chain NF can be obtained by using low-noise clocks for both the transmitter 212 and the receiver 221 (e.g., where the clocks are not shared), it would take a lot of power to gain 10-20 dB in noise reduction. For example, this can be 20-40 dB of VCO power (e.g., 10-100× the usual power). Therefore, the present systems and methods yield significant power savings in achieving the same NF, for example. Such power savings are possible even with the use of a shared clock that is noisy.

Figure 2E:
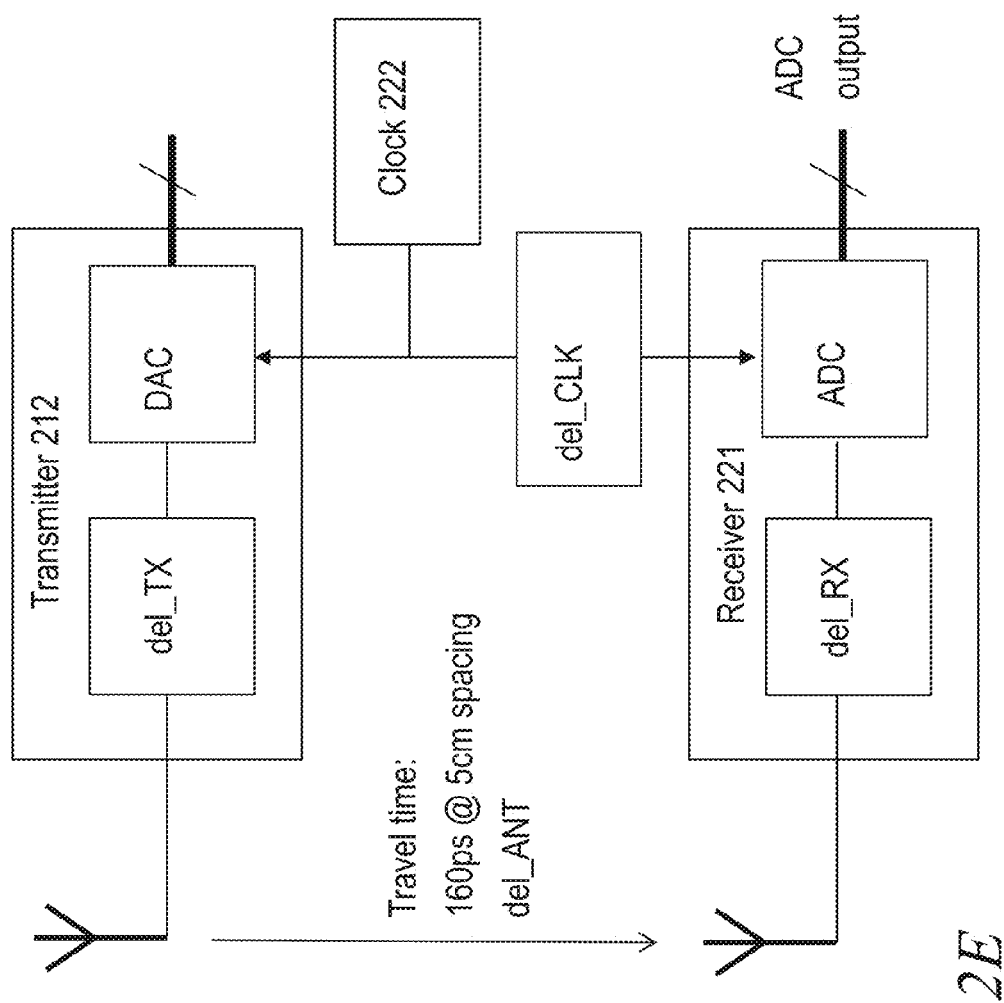
FIG. 2E is a diagram depicting an embodiment of a system for improving noise figure of a wireless receiver.

In one or more embodiments, the present methods and systems perform noise cancellation based on matched delays along the paths of the phase noise from the shared clock source. FIG. 2E depicts one embodiment of a system for improving NF of a receiver. The figure shows delays along two paths taken by the phase noise. For example, the total delay of TX (e.g., along the transmit chain to the transmit antenna) is represented by del_TX, and the total delay of RX (e.g., along the receive chain) is represented by del_RX (e.g., delay up to sampling moment). The wireless travel or propagation time from one antenna to the other is represented by del_ANT. A certain delay del_CLK can be incorporated (e.g., via a configurable delay element in the receiver or clock source for example) for full cancellation of the phase noise:

$$del\_CLK = del\_TX + del\_ANT + del\_RX$$

A small error in del_CLK can result in degraded cancellation, starting at high offset-frequencies. By way of a non-limiting example:

$$del\_TX = del\_RX = 500 \text{ ps (e.g., with a 300 MHz bandwidth)}$$

$$del\_ANT = 160 \text{ ps}$$

$$del\_CLK \text{ for perfect cancellation} = 1.16 \text{ ns}$$

However, if del_CLK=0, the resultant incomplete cancellation may still yield a 10 dB improvement at dF=45 MHz, in one or more embodiments. In one or more embodiments, the delay element may be implemented via buffer and/or inverter based circuits, for example, although other type of elements can be used (e.g., shunt capacitor or voltage-controlled delay element). In one or more embodiments, the system includes a measurement or calibration module for measuring, matching and/or configuring delays through paths from the shared clock source. In one or more embodiments, the wireless receiver 221 and/or a delay circuit of the shared clock source 222 is configurable to adjust, set and/or provide the delay, del_CLK.

In one or more embodiments, one or more of the following ways may be used to detect if the present systems and methods are implemented in a device for example:

In one or more embodiments, one can use or check the technical literature or datasheets of the device. The following items are normally available provided in the technical literature or datasheets of the device: NF degradation given a certain antenna coupling, and out-of-band noise from a transmitter. If the values of these items do not match or are not close, the present systems and methods is being used.

In one or more embodiments, one can use device or chip measurements. One can measure the OOB noise of a transmit signal, and use this signal as a blocker. One can measure how the NF is degraded. If the degradation is less than expected, the present systems and methods have been implemented (e.g., the receiver uses the same clock source as the transmitter).

In one or more embodiments, one can observe or check the device or chip (e.g., de-cap/de-layer). One can check the number of clock sources (PLLs). Each clock source contains a VCO, which normally contains inductors. These inductors are normally made in the upper metal layers and are very visible. The number of clocks can be ascertained, and indicates whether a shared clock is used.

Figure 2F:
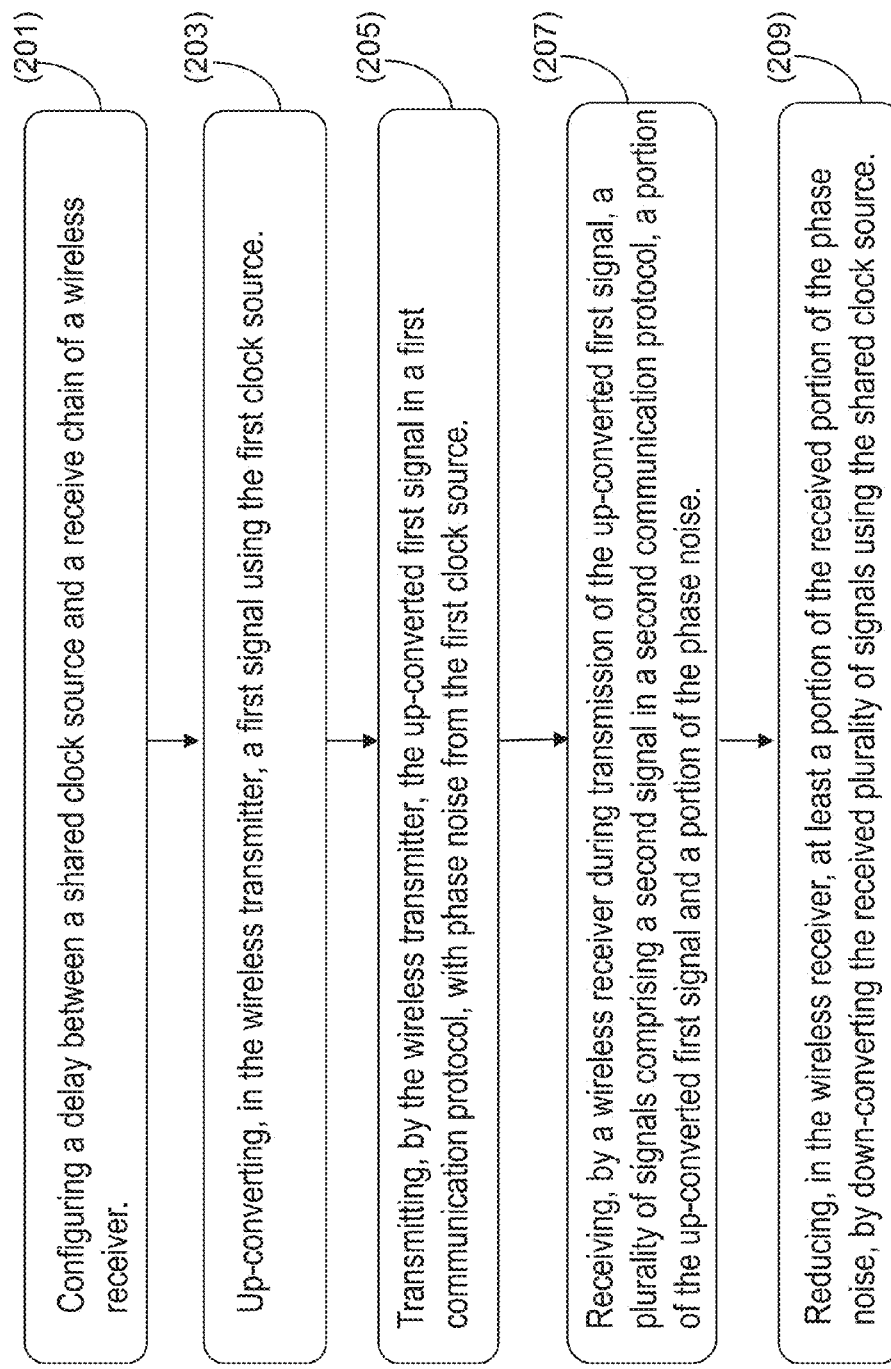
FIG. 2F is a flow diagram of an embodiment of a method for improving noise figure of a wireless receiver.

Referring now to FIG. 2F, one embodiment of a method for improving noise figure of a wireless receiver is depicted. In one or more embodiments, the method includes configuring a delay between a shared clock source and a receive chain of a wireless receiver (operation 201). In one or more embodiments, the method includes up-converting, in a wireless transmitter, a first signal using a first clock source in one or more embodiments (operation 203). The wireless transmitter transmits the up-converted first signal in a first communication protocol, with phase noise from the first clock source in one or more embodiments (operation 205). A wireless receiver receives, during transmission of the up-converted first signal, a plurality of signals including a second signal in a second communication protocol, a portion of the up-converted first signal and a portion of the phase noise, in one or more embodiments (operation 207). The wireless receiver reduces, in the wireless receiver, at least a portion of the received portion of the phase noise by down-converting the received plurality of signals using the shared clock source (operation 207).

Referring now to operation 201, and in some embodiments, a delay is configured between a shared clock source 222 and a receive chain of a wireless receiver 221. In one or more embodiments, the wireless receiver 221 and/or the shared clock source 222 configures, adjusts and/or sets a delay between the shared clock source 222 and a receive chain of the wireless receiver 221. In one or more embodiments, the delay is adjusted to match a propagation delay that includes a first delay in propagating the phase noise from the shared clock source to a transmit chain of the wireless transmitter, and along the transmit chain to a transmit antenna of the transmit chain, and a second delay in propagating the portion of the phase noise from the transmit antenna of the transmit chain to the receive chain (via a receive antenna of the receive chain) up to a point (e.g., mixer or analog-to-digital converter) in the receive chain that performs the down-conversion. In one or more embodiments, the second delay includes a wireless transmission delay (between the antennas of the transmit and receive chains), and a propagation delay from the antenna of the receive chain to the point in the receive chain where down-conversion is performed.

In some embodiments, the wireless receiver 221, the shared clock source and/or another module of the system measures or estimates one or more of the delays described above. In one or more embodiments, a measurement or calibration module of the system measures, matches and/or configures one or more delays through paths from the shared clock source. In one or more embodiments, the wireless receiver 221 and/or a delay circuit of the shared clock source 222 is configurable to adjust, set and/or provide a matched delay to cancel or reduce the phase noise from the shared clock source along two paths. In one or more embodiments, the wireless receiver 221 and/or the shared clock source 222 includes or provides an adjustable or configurable delay element to provide the matched delay. In one or more embodiments, the delay element is configured based on at least one of the measured or estimated delay(s), and the frequency of operation in the wireless transmitter 212, the wireless receiver 221 and/or the shared clock source 222. In one or more embodiments, the delay element is configured based on a table or map of communication protocols and/or operating frequencies to pre-defined or calibrated delays. In some embodiments, a feedback loop provides adjustments to the delay element based on a measurement or estimation of phase noise or NF degradation for example.

Referring now to operation 203, and in some embodiments, the wireless transmitter 212 up-converts a first signal using the shared clock source 222. The wireless transmitter 212 up-converts the first signal to a carrier frequency corresponding to a first communication protocol (e.g., BT), in one or more embodiments. In one or more embodiments, the up-converting (by the wireless transmitter 212) includes digital-to-analog conversion of the first signal using a sampling frequency of the shared clock source 222. In one or more embodiments, the wireless transmitter 212 performs the digital-to-analog conversion using a sampling frequency from the shared clock source 222, to generate a first signal in the first communication protocol. In one or more embodiments, both the wireless transmitter 212 and the wireless receiver 221 are implemented to access or share the same clock source, e.g., shared clock source 222, rather than two clock sources providing clock signals of the same frequency.

Referring now to operation 205, and in some embodiments, the wireless transmitter 212 transmits the up-converted first signal in a first communication protocol, with phase noise from the shared clock source 222. An amplifier (e.g., PA) amplifies the up-converted signal for transmission via a transmitter antenna of the wireless transmitter 212, in one or more embodiments. In one or more embodiments, the wireless transmitter 212 transmits the up-converted first signal in half-duplex operation using the first communication protocol. In one or more embodiments, the wireless transmitter 212 transmits the up-converted first signal in half-duplex operation using the first communication protocol, while the wireless receiver 221 receives a portion of the up-converted first signal in half-duplex operation using the second communication protocol. The operations in the wireless transmitter 212 can include one or more operations discussed above in connection with at least FIGS. 2A-2D. In one or more embodiments, the transmitter 212 produces or acts as a blocker to the receiver 221 responsive to the transmitter 212 and the receiver 221 being active at the same time.

Referring now to operation 207, and in some embodiments, the wireless receiver 221 receives, during transmission of the up-converted first signal, a plurality of signals including a second signal in a second communication protocol, a portion of (e.g., an attenuated version of) the up-converted first signal and a portion of the phase noise. The second signal includes a wanted or desired signal, e.g., a WLAN signal, intended for the wireless receiver 221 in one or more embodiments. A receiver antenna of the wireless receiver 221 couples some of the up-converted first signal and the phase noise transmitted from the transmitter 212, into the wireless receiver 221, although these signals are not intended for the wireless receiver 221 in one or more embodiments. The latter signals are attenuated when received at the receiver 221, in one or more embodiments. A portion of these signals are received at the receiver 221, in one or more embodiments.

In one or more embodiments, the phase noise from the shared clock source 222 includes OOB noise with a frequency distribution that overlaps with a frequency band of the second signal and/or wireless receiver 221. In one or more embodiments, the frequency band of the first signal does not overlap with the frequency band of the second signal. However, the phase noise has a frequency distribution sufficiently wide to overlap in frequency with at least a portion of the second signal, and interfere with the second signal, in one or more embodiments. In one or more embodiments, some portion(s) of the phase noise are at signal levels that exceed that of the second signal.

In one or more embodiments, the wireless transmitter 212 transmits the first signal in a first frequency band, and the wireless receiver 221 receives the second signal in a second frequency band. In one or more embodiments, each of the first frequency band and the second frequency band overlaps in frequency with the phase noise from the shared clock source 222. For example, the phase noise is distributed around the carrier frequency of the first signal, and the phase noise can have frequency components that extend into the second frequency band, in one or more embodiments. In one or more embodiments, the first communication protocol and the second communication protocol each includes one of a bluetooth, a WLAN or a LTE based communication protocol. In one or more embodiments, the wireless transmitter and the wireless receiver each operates at a different frequency band. For example, in one or more embodiments, the first communication protocol and the second communication protocol both correspond to a communication protocol (e.g., LTE-based or WLAN-based protocol) in operation over different (e.g., non-overlapping) frequency channels. In one or more embodiments, the first communication protocol (e.g., WLAN) is different from the second communication protocol (e.g., LTE), not merely in the frequency of operation.

Referring now to operation 209, and in some embodiments, the wireless receiver 212 reduces, in the wireless receiver 221, at least a portion of the received portion of the phase noise by down-converting the received plurality of signals using the shared clock source 222. In some embodiments, the wireless receiver 212 reduces or cancels, in the wireless receiver 221, the received portion of the phase noise by down-converting the received plurality of signals using the shared clock source 222. In one or more embodiments, the wireless receiver 221 down-converts the received plurality of signals using the shared clock source 222. In some embodiments, the wireless receiver 221 down-converts the received plurality of signals the using the shared clock source 222 to reduce or cancel the phase noise.

In one or more embodiments, the down-converting (by the wireless receiver 221) includes analog-to-digital conversion of the received plurality of signals using the sampling frequency from the shared clock source 222. In one or more embodiments, the wireless receiver 221 performs (via an analog-to-digital converter) analog-to-digital conversion of the received plurality of signals using a sampling frequency from the shared clock source 222. In one or more embodiments, the wireless receiver 221 performs analog-to-digital conversion of the received plurality of signals, and reduction or cancellation of the portion of the transmitted phase noise, using the sampling frequency from the shared clock source 222.

When the transmitter 212 and the receiver 221 operate at the same time using clock 222, the system inherently enables the OOB or phase noise from the transmitter 212 to be canceled at least in part, in one or more embodiments. The system (e.g., the receiver 221) experiences or sees reduced reciprocal mixing when the transmitter 212 and the receiver 221 operate at the same time using clock 222. For example, responsive to the transmitter 212 and the receiver 221 using the same clock 222, an analog-to-digital converter (ADC) of the receiver 221 cancels at least a portion of the OOB noise arising from the transmitter 212 or the shared clock source 222, in one or more embodiments. The ADC receives phase noise from the shared clock 222, which cancels at least a portion of the phase noise received from the transmitter. Responsive to the wireless transmitter 212 and the wireless receiver 221 using the same clock 222 while operating in parallel or with each other, the ADC produces reduced levels of reciprocal mixing, in one or more embodiments. The ADC produces reduced reciprocal mixing, resulting in an improved NF in one or more embodiments. Phase noise from the clock 222 is significantly reduced in the ADC output spectrum, resulting in an improved NF in one or more embodiments.

Although certain examples of communications systems described above can include devices operating according to a 3GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, signals, communication protocols, etc., for purposes of identifying or differentiating one from another or from others. These terms are not intended to merely relate entities (e.g., a first signal and a second signal) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:
1. A method for improving noise figure, the method comprising:
  up-converting, in a wireless transmitter, a first signal using a shared clock source;
  transmitting, by the wireless transmitter, the up-converted first signal in a first communication protocol, with phase noise from the shared clock source;

receiving, by a wireless receiver during transmission of the up-converted first signal, a plurality of signals comprising a second signal in a second communication protocol, a portion of the up-converted first signal and a portion of the phase noise; and reducing, in the wireless receiver, at least a portion of the received portion of the phase noise, by configuring a delay for the propagation of the phase noise from the shared clock source to a receive chain of the wireless receiver, and by down-converting, using the shared clock source, the received plurality of signals which comprises the portion of the phase noise, the second signal in the second communication protocol, and the portion of the up-converted first signal.

2. The method of claim 1, wherein the transmitting comprises transmitting in half-duplex operation using the first communication protocol, and the receiving comprises receiving in half-duplex operation using the second communication protocol.

3. The method of claim 1, wherein the phase noise from the shared clock source comprises out-of-band (OOB) noise with a frequency distribution that overlaps with a frequency band of the second signal.

4. The method of claim 1, wherein the up-converting comprises digital-to-analog conversion of the first signal using a sampling frequency from the shared clock source, and the down-converting comprises analog-to-digital conversion of the received plurality of signals using the sampling frequency from the shared clock source.

5. The method of claim 1, comprising transmitting the first signal in a first frequency band and receiving the second signal in a second frequency band, each of the first frequency band and the second frequency band overlapping in frequency with the phase noise from the shared clock source.

6. The method of claim 1, comprising configuring the delay to match a propagation delay comprising a first delay in propagating the phase noise from the shared clock source along a transmit chain of the wireless transmitter, and a second delay in propagating the portion of the phase noise from the transmit chain to the receive chain up to a point in the receive chain for the down-conversion.

7. The method of claim 1, wherein the first communication protocol and the second communication protocol each comprises one of a bluetooth, a wireless local area network (WLAN) or a long term evolution (LTE) based communication protocol, and the wireless transmitter and the wireless receiver are each configured to operate at a different frequency band.

8. A system for improving noise figure, the system comprising:
a shared clock source;
a wireless transmitter configured to up-convert a first signal using the shared clock source, and to transmit the up-converted first signal in a first communication protocol with phase noise from the shared clock source; and
a wireless receiver configured to:
receive, during transmission of the up-converted first signal, a plurality of signals comprising a second signal in a second communication protocol, a portion of the up-converted first signal and a portion of the phase noise, and
reduce, in the wireless receiver, at least a portion of the received at least a portion of the phase noise, by configuring a delay for the propagation of the phase noise from the shared clock source to a receive chain of the wireless receiver, and by down-converting, using the shared clock source, the received plurality of signals which comprises the portion of the phase noise, the second signal in the second communication protocol, and the portion of the up-converted first signal.

9. The system of claim 8, wherein the wireless transmitter is configured to transmit in half-duplex operation using the first communication protocol, and the wireless received is configured to receive in half-duplex operation using the second communication protocol.

10. The system of claim 8, wherein the phase noise from the shared clock source comprises out-of-band (OOB) noise with a frequency distribution that overlaps with a frequency band of the second signal.

11. The system of claim 8, wherein the wireless transmitter is configured to perform digital-to-analog conversion of the first signal using a sampling frequency from the shared clock source, and the wireless receiver is configured to perform analog-to-digital conversion of the received plurality of signals using the sampling frequency from the shared clock source.

12. The system of claim 8, wherein the wireless transmitter is configured to transmit the first signal in a first frequency band and the wireless receiver is configured to receive the second signal in a second frequency band, each of the first frequency band and the second frequency band overlapping in frequency with the phase noise from the shared clock source.

13. The system of claim 8, wherein the delay is configured to match a propagation delay comprising a first delay in propagating the phase noise from the shared clock source along a transmit chain of the wireless transmitter, and a second delay in propagating the portion of the phase noise from the transmit chain to the receive chain up to a point in the receive chain for the down-conversion.

14. The system of claim 8, wherein the first communication protocol and the second communication protocol each comprises one of a bluetooth, a wireless local area network (WLAN) or a long term evolution (LTE) based communication protocol, and the wireless transmitter and the wireless receiver are each configured to operate at a different frequency band.

15. A method for improving noise figure, the method comprising:
performing, in a wireless transmitter, digital-to-analog conversion using a sampling frequency from a shared clock source, to generate a first signal in a first communication protocol;
transmitting, by the wireless transmitter via a first antenna, the generated first signal with phase noise from the shared clock source;
receiving, by a wireless receiver via a second antenna, a plurality of signals comprising a second signal in a second communication protocol, a portion of the transmitted first signal and a portion of the transmitted phase noise; and
performing, by the wireless receiver using the sampling frequency from the shared clock source, analog-to-digital conversion of the received plurality of signals which comprises the portion of the phase noise, the second signal in the second communication protocol, and the portion of the up-converted first signal, and reduction or cancellation of the portion of the transmitted phase noise by configuring a delay for the propagation of the phase noise from the shared clock source to a receive chain of the wireless receiver.

16. The method of claim 15, wherein the transmitting comprises transmitting in half-duplex operation using the first communication protocol, and the receiving comprises receiving in half-duplex operation using the second communication protocol.

17. The method of claim 15, wherein the phase noise from the shared clock source comprises out-of-band (OOB) noise with a frequency distribution that overlaps with a frequency band of the second signal.

18. The method of claim 15, comprising transmitting the first signal in a first frequency band and receiving the second signal in a second frequency band, each of the first frequency band and the second frequency band overlapping in frequency with the phase noise from the shared clock source.

19. The method of claim 15, wherein the delay is configured to match a propagation delay comprising a first delay in propagating the phase noise from the shared clock source along a transmit chain of the wireless transmitter, and a second delay in propagating the portion of the phase noise from the transmit chain to the receive chain up to a point in the receive chain for the down-conversion.

20. The method of claim 15, wherein the first communication protocol and the second communication protocol each comprises one of a bluetooth, a wireless local area network (WLAN) or a long term evolution (LTE) based communication protocol, and the wireless transmitter and the wireless receiver are each configured to operate at a different frequency band.

* * * * *